(12) United States Patent
Winikka (10) Patent No.: US 6,691,030 B2
(45) Date of Patent: Feb. 10, 2004

(54) SYSTEM AND METHOD FOR LOCATING A WAYPOINT

(75) Inventor: Kurt A. Winikka, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/114,860

(22) Filed: Apr. 1, 2002

(65) Prior Publication Data

US 2002/0140810 A1 Oct. 3, 2002

Related U.S. Application Data

(60) Provisional application No. 60/280,907, filed on Apr. 2, 2001.

(51) Int. Cl.[7] ............................................... G01C 21/00
(52) U.S. Cl. ........................................ 701/206; 701/213
(58) Field of Search ............................... 701/3, 14, 200, 701/206, 207, 213; 342/357.01; 340/945

(56) References Cited

U.S. PATENT DOCUMENTS 6,263,263 B1 * 7/2001 Shehi et al. .................... 701/3
6,449,556 B1 * 9/2002 Pauly .......................... 701/206

* cited by examiner

*Primary Examiner*—Yonel Beaulieu (57) ABSTRACT

A navigation system may be used to generate a navigation map for a flight display for an aircraft. The navigation map may include waypoint symbols representing various waypoints, landmark symbols representing various landmarks, and/or navigation data symbols representing various navigation data. Upon receiving a user input selecting a waypoint, the navigation system generates a waypoint locator symbol for the corresponding selected waypoint and generates a waypoint pointer symbol between the waypoint locator symbol and a position on the navigation map representing a present position. In some instances, the navigation system generates a selected waypoint symbol within the waypoint locator symbol.

25 Claims, 5 Drawing Sheets

SYSTEM AND METHOD FOR LOCATING A WAYPOINT

CROSS REFERENCE TO RELATED APPLICATIONS

This application claims benefit of priority to U.S. patent application Ser. No. 60/280,907, filed Apr. 2, 2001, and entitled Navigation Map Waypoint Locator/Pointer, the contents of which are incorporated herein by reference.

FIELD OF THE INVENTION

The present invention relates to the field of locating a waypoint on a flight display of a navigation system.

BACKGROUND OF THE INVENTION

Navigation systems for aircraft provide various aircraft data and land data to pilots during the operation of the aircraft. In some navigation systems, the aircraft data and land data are provided on a single display so that a pilot has fewer instruments to monitor. Other navigation systems are further enhanced with a moving navigation map graphically depicting land data, such as roads, towers, mountains, lakes, and other geographic identifiers. These navigation maps further may include symbols identifying waypoints, such as airports, intersections identifying where different flight plans and/or airways intersect, non-directional beacons (NDBs), very high frequency omni-directional radio identifiers (VORs), user defined waypoints, and other waypoints. Typically, a specific symbol identifies each type of waypoint and/or landmark. Additionally, the navigation maps may include aircraft data, such as air speed, bearing, tracking, and other aircraft data.

The land data and aircraft data (collectively, navigation data) sometimes becomes complex when presented to an aircraft pilot on one or more displays. Enabling the aircraft pilot to directly manipulate the navigation data by enabling an aircraft pilot to select one or more waypoints, and the associated waypoint data, may lower the complexity of some operations the aircraft pilot completes while operating the aircraft. Further, enabling the aircraft pilot to select a waypoint and, in response, generating additional information for the selected waypoint may help the pilot safely select a flight plan and/or navigate a selected flight plan.

However, identifying and selecting one waypoint and its associated navigation data may require an aircraft pilot to interact with the navigation system more than desired. Therefore, systems and methods are desired that will quickly and unambiguously help the aircraft pilot locate a waypoint and its associated navigation data on a moving navigation map.

SUMMARY OF THE INVENTION

In one aspect, the present invention is directed to a method for identifying a waypoint on a navigation map generated for a flight display. The method comprises receiving an input for selecting the waypoint. The method includes generating, in response to the input, a waypoint locator symbol relative to the selected waypoint and a waypoint pointer symbol between the waypoint locator symbol and a position on the navigation map representing a present position.

In another aspect, the present invention is directed to a system for identifying a waypoint for a flight display. The system comprises an aeronautical data unit configured with cartography data, a navigation database configured with waypoint data, a navigation engine, and a graphics engine. The navigation engine is configured to receive the waypoint data from the navigation database, to receive a user input for a selected waypoint, and to transmit the waypoint data and an identification of the selected waypoint to the graphics engine. The graphics engine is configured to receive the cartography data from the aeronautical unit, to receive the waypoint data and the selected waypoint identification from the navigation engine, and to generate a navigation map for display. The navigation map comprises a selected waypoint symbol identifying the selected waypoint, a waypoint locator symbol relative to the selected waypoint symbol, and a waypoint pointer symbol between the waypoint locator symbol and a position on the navigation map representing a present position.

DETAILED DESCRIPTION OF THE PREFERRED EMBODIMENTS

The systems and method of the present invention generate a flight display in which a waypoint may be selected and clearly identified on a navigation map. The present invention may be used, for example, for navigation systems that produce a variety of waypoint symbols on a navigation map for which one or more waypoint symbols may be selected and, in response, for which waypoint data for the selected waypoints may be rendered.

In one embodiment, a navigation system generates a present position symbol for a flight display. Upon receiving a user input corresponding to a selected waypoint, the navigation system generates a waypoint locator relative to the selected waypoint and a waypoint pointer from the present position symbol to the waypoint locator. In some embodiments, the waypoint locator may surround the selected waypoint, be adjacent to the selected waypoint, or appear to be behind the selected waypoint. Other embodiments also may include a course line symbol, such as one or more joined lines, depicting a flight plan path.

In one preferred embodiment, multiple waypoints are depicted on a navigation map, each by an associated waypoint symbol. If a waypoint is selected, a locator symbol is rendered relative to the corresponding selected waypoint symbol to clearly identify the selected waypoint symbol. In this embodiment, a background area with a background color is rendered relative to the selected waypoint symbol, and a shape, such as a circle, is rendered on or around the background area. The selected waypoint symbol is rendered in the background area within the shape, such that the selected waypoint symbol appears to be re-rendered on or within the locator symbol. Additionally, a pointer symbol, such as a line, is rendered between the locator symbol and the present position symbol to depict the path between the present position and the selected waypoint. In other embodiments, the background area is rendered around the selected waypoint symbol so that the selected waypoint symbol is not re-rendered. As used herein, "relative to" in conjunction with the locator symbol means on, above, below, next to, behind, partially behind, surrounding, partially surrounding, encompassing, connected to, pointing to, or otherwise associated with the selected waypoint symbol, including if the waypoint symbol is re-rendered and/or not re-rendered.

Figure 1:
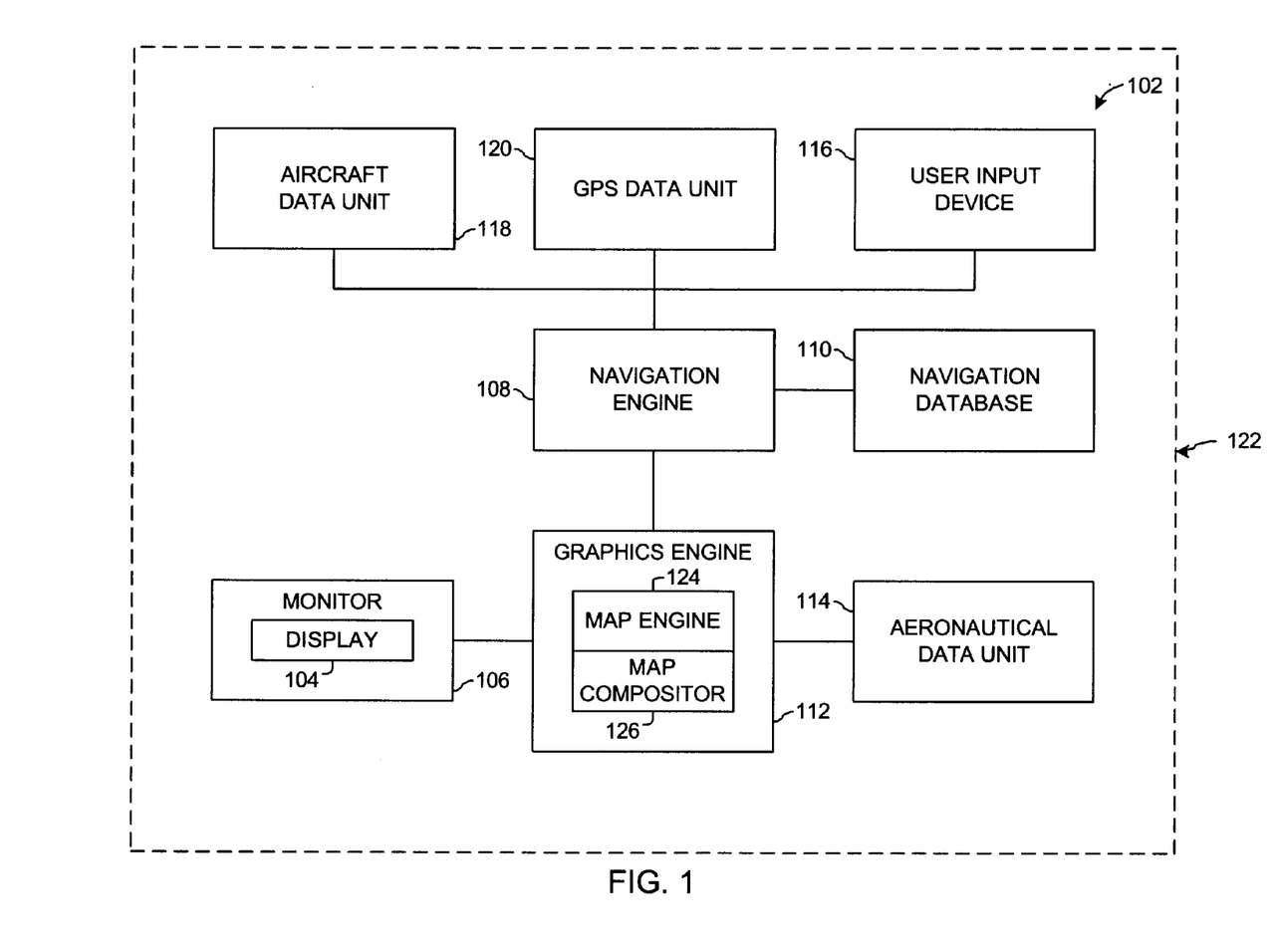
FIG. 1 is a block diagram illustrating a navigation system in accordance with an embodiment of the present invention.

FIG. 1 depicts an exemplary embodiment of a navigation system 102 configured to generate a flight display 104 for a flight monitor 106. The navigation system 102 of FIG. 1 includes a navigation engine 108, a navigation database 110, a graphics engine 112, and an aeronautical data unit 114. The navigation system 102 optionally may include a user input device 116, an aircraft data unit 118, and a global positioning system (GPS) data unit 120. The navigation system 102 may be housed in an aircraft 122.

It will be appreciated that in some instances the display 104 may be generated remotely from the navigation system 102, such as with a remotely-controlled aircraft, or the navigation system may be remote from the aircraft. It also will be appreciated that in some instances the user may be remote from the navigation system 102, such as with a remotely-controlled aircraft or navigation system.

The navigation engine 108 receives navigation data from the navigation database 110 and provides the navigation data to the graphics engine 112 for display. The navigation engine 108 also collects aircraft data from the aircraft data unit 118 and GPS data from the GPS data unit 120, when present. The navigation engine 108 processes the aircraft data and the GPS data, such as by collating the data, and transmits the data to the graphics engine 1 12 for display. The navigation engine 108 further may receive selections and other user input from the user input device 116. The navigation engine 108 processes the selections and/or other user inputs to determine what navigation data, aircraft data, GPS data, and/or navigation map data is to be generated for the display 104 and directs the graphics engine 112 to generate that data for display.

For example, if a user selects a waypoint via a user input device 1 16, the navigation engine 108 receives the input and, in response, may look up navigation data corresponding to the selected waypoint. The navigation engine 108 then may transmit the navigation data to the graphics engine 112 for display. The navigation data may include an identification of the selected waypoint so that the graphics engine 112 can render a waypoint symbol, a location symbol, and/or a pointer symbol for the selected waypoint.

The navigation database 110 contains the navigation data for the navigation system 102. The navigation data may include, for example, airport names, tower frequencies, airport elevations, waypoint locations, including latitude and longitude of waypoints, waypoint identifiers, obstacles, heights of obstacles, and/or other navigation data.

The navigation database 110 may include memory in which the navigation data resides. In one embodiment, the navigation database 110 includes an erasable programmable read only memory (EPROM), an electrically erasable programmable read only memory (EEPROM), and/or another memory in which the navigation data resides.

The graphics engine 112 generates the navigation map for the display 104. The navigation map may include one or more types of symbols identifying navigation data, aircraft data, and/or cartography data. The cartography data may identify, for example, geographical boundaries, cities, freeways, national highways, local highways, railroads, rivers, lakes, obstacles, and/or waypoints. The graphics engine 112 may be configured to generate a present position symbol for the navigation map to depict the present position of the aircraft in relation to the landmarks, waypoints, or other symbols and/or identifiers on the navigation map. The graphics engine 112 also may be configured to generate a course line symbol, such as one or more joined lines, depicting a selected flight plan path. The present position symbol and the course line symbol preferably are a color different from the background color of the navigation map.

The graphics engine 112 also generates the waypoint locator and the waypoint pointer for the display 104. In one embodiment, the graphics engine 112 generates a waypoint locator symbol for the waypoint locator and a waypoint pointer symbol for the waypoint pointer.

In one example, the waypoint locator symbol includes a background area and an outline shape on or around the background area. The term "outline shape" is meant to include a partial outline shape and is not intended to require a shape to mark the outer limits of the background area, although this may be included. Thus, the outline shape may define a perimeter of a background area, may overlay a portion or all of the background area, may be within or partially within the perimeter of the background area, or may be outside of the perimeter of the background area.

In one embodiment, the background area may be one color, such as a color of the navigation map background, and the outline shape may be another color. For example, the waypoint locator symbol may be a circle in which the interior of the circle is one color and the perimeter of the circle is another color. The shape of the background area and/or the outline shape may be a circle, a triangle, a square, a rectangle, a polygon, an arc, a line, or another shape. The background area and the outline shape may be the same shape or different shapes, and they further may include shading or other delimiters.

In another example, the waypoint pointer symbol includes a line between the present position symbol and the waypoint locator symbol. In this example, the waypoint pointer symbol is a color different from the navigation map background. Although, the waypoint pointer symbol may be a color the same as, or different from, the background area and/or the outline shape of the waypoint locator symbol. Additionally, if a flight path plan symbol, such as a course line, is depicted for the flight plan path, the waypoint symbol line preferably is a color different from the flight path plan symbol color.

In one example, the waypoint locator symbol and the waypoint pointer symbol together would appear to depict a present position symbol, a blank region rendered around the selected waypoint, a circle drawn around the waypoint and the blank region, and a line extending between the circle and the present position symbol. This would enable a pilot to quickly locate the selected waypoint on the navigation map, especially when one or more waypoints are in a waypoint cluster at or near the selected waypoint.

It will be appreciated that other examples exist. For example, a square or another shape may be generated for or around a selected waypoint. Alternately, a background color other than the background of the immediate area surrounding the selected waypoint may be generated. Alternately, no background area may be generated, and only the outline shape may be generated. In some instances, the background area without the outline shape may be generated, or the same waypoint symbol may be generated for a waypoint regardless of the waypoint type. Alternately, either the waypoint locator symbol or the waypoint pointer symbol may include an alternate symbol or an additional symbol. For example, the waypoint pointer symbol may include an arrowhead in the direction of the potential flight path. Other examples exist within the scope of the invention.

The graphics engine 112 of FIG. 1 includes a map engine 124 and a map compositor 126. The map engine 124 accesses the cartography data from the aeronautical data unit 114 and renders the cartography data for the navigation map for the display 104. The cartography data may, for example, include landmark data and other land data.

The map compositor 126 may be configured to combine aircraft data and/or navigation data received from the navigation engine 108 with the navigation map produced by the map engine 124 and to render the composite map for the display 104. The navigation data may include, for example, waypoint data. Therefore, the composite navigation map may depict the cartography data and the waypoints in relation to the cartography data, each waypoint depicted with the correct symbol, at the correct location, and with associated data, such as identifiers, if any. Alternately, the map compositor 126 may render aircraft data and/or navigation data separately such that it overlays a previously generated navigation map.

Further, the map compositor 126 may receive waypoint selection data, such as a waypoint identifier, from the navigation engine 108 and render the waypoint locator and/or the waypoint pointer for the selected waypoint. In one embodiment, the map compositor 126 renders a waypoint locator symbol and a waypoint pointer symbol such that it overlays a previously generated navigation map (or composite navigation map). In another embodiment, the map compositor 126 combines a waypoint locator symbol and a waypoint pointer symbol with a navigation map generated by the map engine 124, including any other associated navigation data and/or aircraft data, if any, and renders the composite navigation map for the display 104. In either of these embodiments, a waypoint symbol may be included. It will be appreciated that the map engine 124 and the map compositor 126 need not be separate components or components identified apart from the graphics engine 112, and their functionality may be provided with the graphics engine.

The aeronautical data unit 114 comprises cartography data for the navigation map. In one embodiment, the aeronautical data unit 114 also includes navigation data. In this example, the navigation data is accessed by the graphics engine 112 and transmitted to the navigation engine 108. The navigation engine 108 in this example stores the navigation data in the navigation database 110.

The aeronautical data unit 114 may include memory in which the cartography data and/or the navigation data is stored. In one embodiment, the aeronautical data unit 114 includes a data card reader configured to read a data card, such as a flash data card, on which the cartography data and/or the navigation data is stored. Alternately, the aeronautical data unit 114 may include an EPROM, an EEPROM, and/or another type of memory on which the cartography data and/or the navigation data resides.

The user input device 116 is configured to transmit a selection or other user input to the navigation engine 108. The user input device 116 may include, for example, a rotatable knob, one or more input buttons, a mouse, a track ball, a touch screen, and/or another input device.

The aircraft data unit 118 collects aircraft data, such as aircraft navigation data, aircraft attitude data, and/or aircraft air data. The aircraft data may include, for example, bearing information, air/ground speed, attitude information, distance information, left/right deviation, altitude data, longitude and latitude data, and/or other aircraft data. The aircraft data unit 118 is configured to transmit aircraft data to the navigation engine 108.

The GPS data unit 120 is configured to provide GPS data to the navigation engine 108. The GPS data unit 120 may include a GPS receiver configured to receive GPS data from a GPS source, such as from one or more GPS satellites, and to transmit that GPS data to the navigation engine 108.

Figure 2:
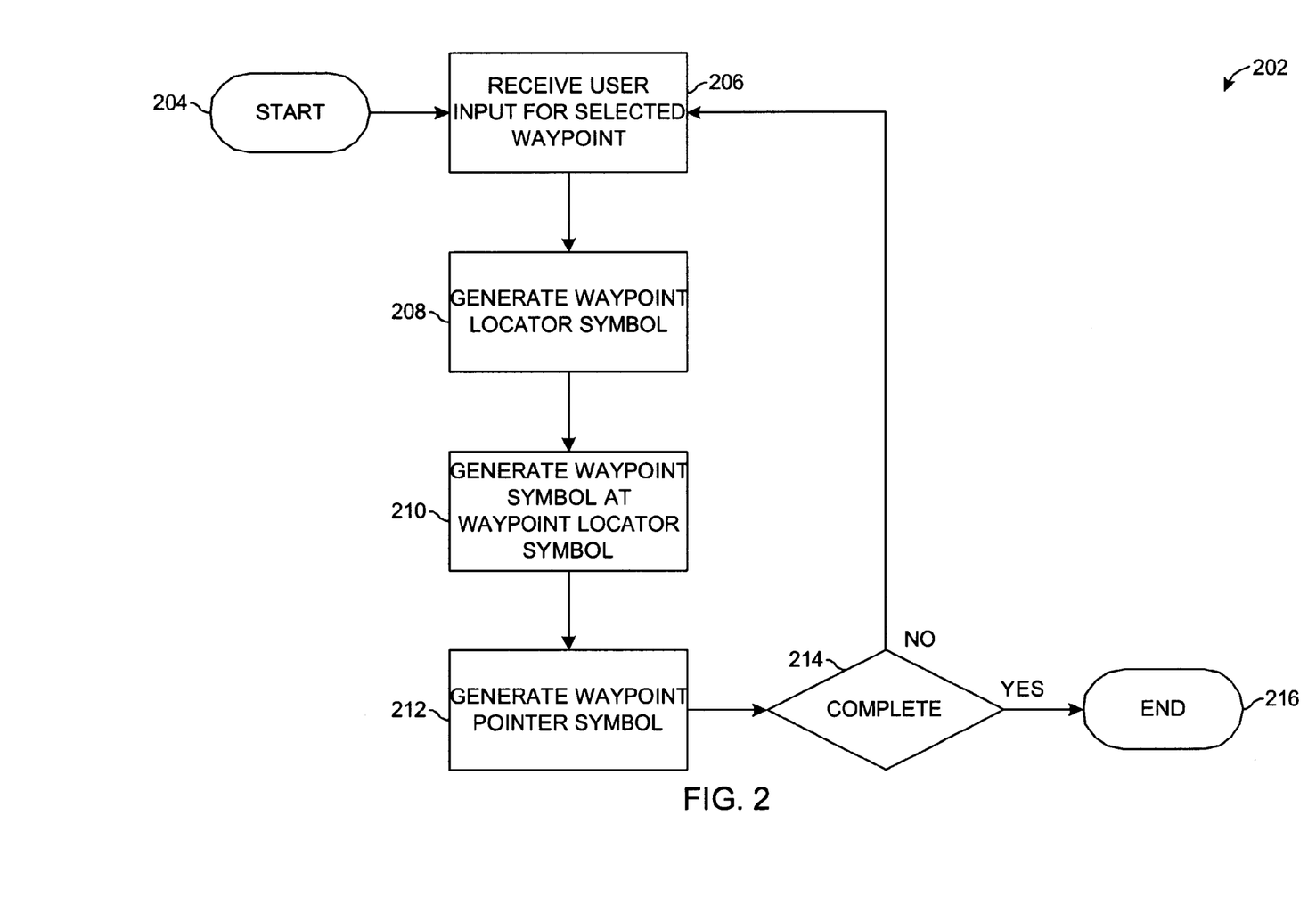
FIG. 2 is a flow diagram illustrating a waypoint locator/pointer process in accordance with an embodiment of the present invention

FIG. 2 depicts an exemplary embodiment of a waypoint locator/pointer process in accordance with which the navigation system of FIG. 1 may be configured to operate. The process 202 starts at step 204 at which point a navigation map is generated for display. The navigation map may include symbols representing cartography data, waypoint data, and/or aircraft data.

A user input for a selected waypoint is received at step 206. At step 208, a waypoint locator symbol is generated for the navigation map relative to a position of the selected waypoint. In this embodiment, the waypoint locator symbol comprises a background area and an outline shape. The background area is one color, and the outline shape is a color different from the background area color. The background area color may be the same as, or different from, the background color of the navigation map. In other embodiments, the background symbol may comprise a background area only, an outline shape only, text with the background area and/or the outline shape, and/or another shape, such as an arrow or other shape.

A waypoint symbol corresponding to the selected waypoint is generated at the waypoint locator symbol at step 210. A waypoint pointer symbol is generated at step 212. In this embodiment, the waypoint pointer symbol is a line between the waypoint locator symbol and a position on the navigation map representing a present position of the navigation system 102 with respect to the selected waypoint. In other embodiments, the waypoint pointer symbol may comprise a shape different from or in addition to a line, text with or without the line or other shape, and/or another shape, such as an arrow or other shape. Preferably, the waypoint pointer symbol has a color different from the navigation map background color. Also, if a symbol for a flight plan path is generated for the navigation map, the waypoint pointer symbol may have a color different from the flight plan path symbol.

If the user does not provide another user input, the process is complete at step 214, and the process ends at step 216. If the user does provide another user input, the process is not complete at step 214, and the process continues at step 206.

In some embodiments, the waypoint locator symbol, the waypoint symbol, and the waypoint pointer symbol generated at steps 208–212 are rendered as one or more overlays for the navigation map. In other embodiments, the waypoint locator symbol, the waypoint symbol, and the waypoint pointer symbol generated at steps 208–212 are rendered with the navigation map as a composite map. In other embodiments, at step 208, the waypoint locator symbol is generated around a waypoint symbol, and the waypoint symbol is not generated at step 210. Accordingly, the waypoint locator symbol and the waypoint pointer symbol may be rendered as one or more overlays or as a composite map with the waypoint symbol and/or the existing navigation map.

The navigation system 102 of FIG. 1 may be configured to generate a display in accordance with the following examples depicted in FIGS. 3–6. Those skilled in the art appreciate that other examples exist.

Figure 3:
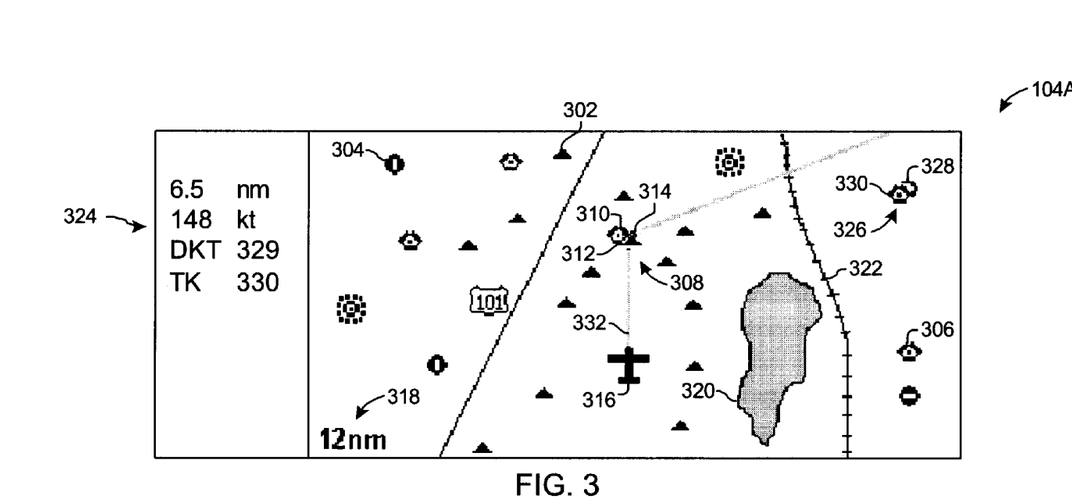
FIG. 3 is a screen diagram illustrating a display without a waypoint locator symbol or a waypoint pointer symbol.

FIG. 3 depicts an exemplary embodiment of a display 104A generated by the navigation system 102. The display 104A depicts several waypoint symbols, including an intersection waypoint symbol 302, an airport waypoint symbol 304, and a VOR waypoint symbol 306. The display 104A also includes a waypoint cluster 308 comprising another VOR waypoint symbol 310, another intersection waypoint symbol 312, and another airport waypoint symbol 314. It will be appreciated that, without the waypoint locator and the waypoint pointer, it is difficult or not possible to distinguish between the three waypoint symbols 310–314 at the waypoint cluster 308.

The display 104A also depicts a present position symbol 316 in the form of an aircraft, a scale indicator symbol 318, landmark symbols, including a lake symbol 320 and a railroad symbol 322, and one or more aircraft data symbols 324 identifying aircraft data. In the example of FIG. 3, the aircraft symbols 324 include an identification of 6.5 nautical miles (nm) to the next waypoint, a ground speed of 148 knots (kt), a desired track (DTK) of 329 degrees, and an actual track (TK) of 330 degrees. Other symbols may be included, such as another waypoint cluster 326 comprising another airport waypoint symbol 328 and another VOR waypoint symbol 330. Also, a symbol for a course line 332 identifying a flight plan path may be included. Other symbols, fewer symbols, or more symbols, including aircraft data symbols, waypoint symbols, navigation symbols, present position symbols, and/or land symbols, may be included in the display 104A. For clarity, the symbols and corresponding reference numerals identified with respect to FIG. 3 will not be further identified with respect to FIGS. 4–6 unless specifically discussed in those Figures.

Figure 4:
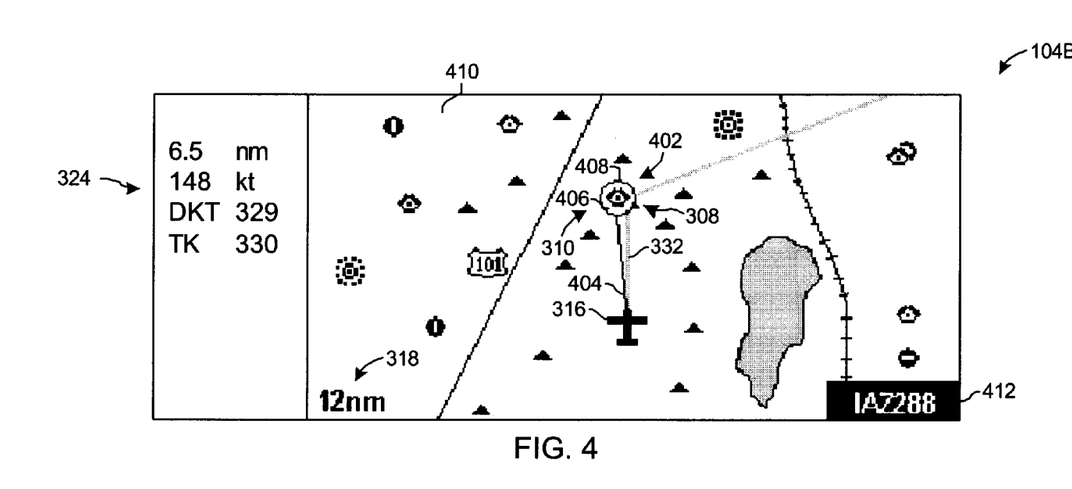
FIG. 4 is a screen diagram illustrating a display with a waypoint locator symbol and a waypoint pointer symbol for a selected waypoint in accordance with an embodiment of the present invention.

FIG. 4 depicts an exemplary embodiment in which a waypoint locator symbol and a waypoint pointer symbol are used to identify a selected waypoint. In the embodiment of FIG. 4, the VOR waypoint symbol 310 is selected via a user input. In this example, a waypoint locator symbol 402 and a waypoint pointer symbol 404 are generated for the display 104B to clearly identify the selected VOR waypoint symbol 310.

The waypoint locator symbol 402 comprises a background area 406 and an outline shape 408. The background area 406 is generated for an area around the selected VOR waypoint symbol 310 and has a background area color. The outline shape 408 is generated for the background area 406 and has an outline shape color. The outline shape 408 of FIG. 4 has the form of a circle. In this example, the color of the background area 406 is the same as the color of the navigation map background 410, and the color of the outline shape 408 is different from the color of the background area. Other colors may be used.

In the embodiment of FIG. 4, the waypoint pointer symbol 404 is in the form of a line between the present position symbol 316 and the waypoint locator symbol 402. In this example, the line for the waypoint pointer symbol 404 is generated for a color different from the course line 332 symbolizing the flight plan path. It will be appreciated that other symbols, such as a waypoint identifier 412, a scale indicator symbol 318, and/or one or more aircraft data symbols 324, may be included for the display 104B.

In this example, the VOR waypoint symbol 310 is rendered over the waypoint locator symbol 402 and is not a part of the waypoint locator symbol. However, in other embodiments, the VOR waypoint symbol 310 (or another waypoint symbol) is rendered over the background area 406 and is considered a part of the waypoint locator symbol 402. In still other embodiments, the background area 406 is rendered around the VOR waypoint symbol 310, not over it. In these embodiments, the waypoint locator symbol 402 comprises the background area 406 and the outline shape 408, not the VOR waypoint symbol 310. Although, in still other embodiments, the background area 406 is rendered around the VOR waypoint symbol 310, not over it, and the waypoint locator symbol 402 comprises the background area 406, the outline shape 408, and the VOR waypoint symbol 310.

Figure 5:
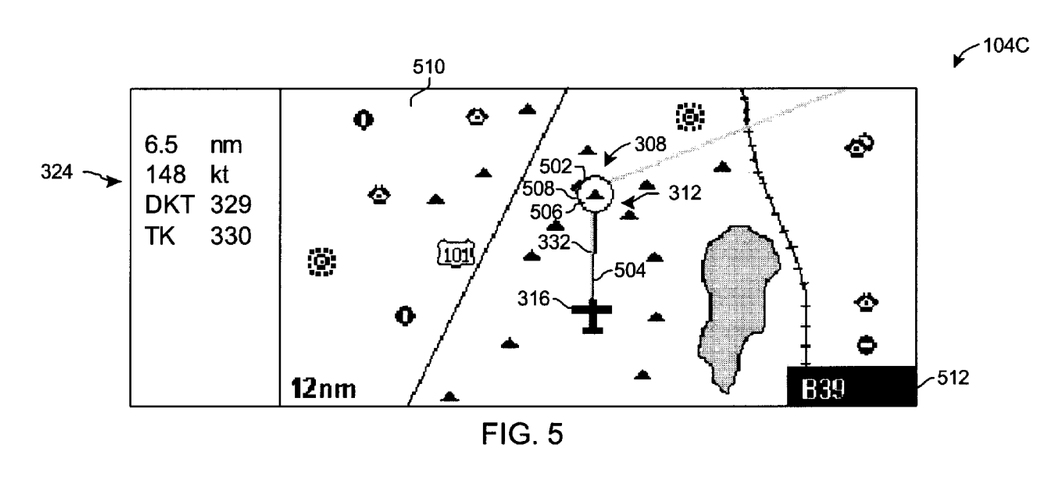
FIG. 5 is a screen diagram illustrating a display with a waypoint locator symbol and a waypoint pointer symbol for another selected waypoint in accordance with an embodiment of the present invention.

FIG. 5 depicts an exemplary embodiment of another selected waypoint from the waypoint cluster 308. In the embodiment of FIG. 5, the intersection waypoint symbol 312 is selected from the waypoint cluster 308. Like the selection of FIG. 4, the selected intersection waypoint symbol 312 clearly is identified and may easily be seen in the display 104C of FIG. 5. The intersection waypoint symbol 312 may be selected, for example, via an input from a user input device 116 (see FIG. 1).

Upon selection of the intersection waypoint symbol 312 of the waypoint cluster 308, a waypoint locator symbol 502 and a waypoint pointer symbol 504 are generated for the display 104C. In the example of FIG. 5, the waypoint locator symbol 502 includes a background area 506 generated to surround the selected intersection waypoint symbol 312 and a circle generated for the background area as the outline shape 508. A line is generated for the waypoint pointer symbol 504 between the present position symbol 316 and the waypoint locator symbol 502. The line in this example is generated in a color different from the course line 332 and different from the color of the navigation map background 510. Additionally, a waypoint identifier 512 optionally may be generated for the display 104C.

Figure 6:
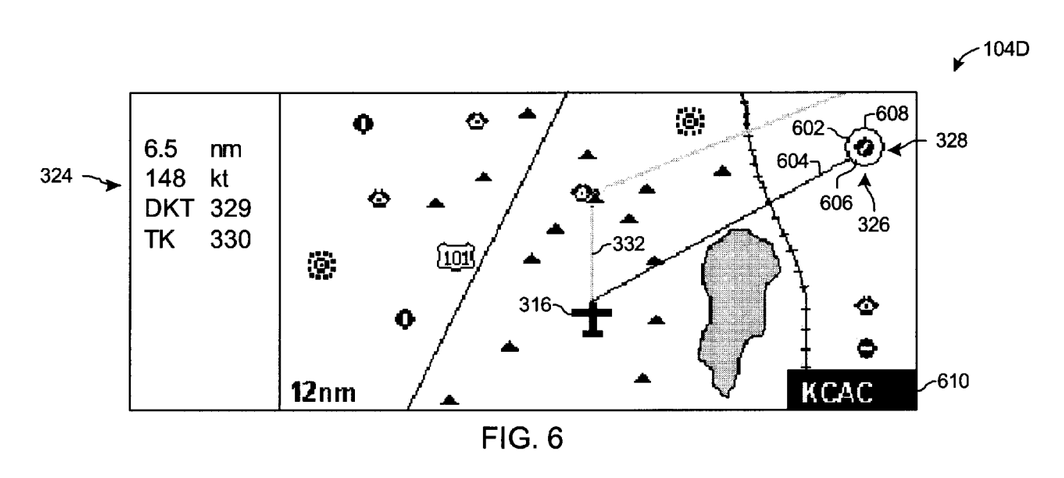
FIG. 6 is a screen diagram illustrating a display with a waypoint locator symbol and a waypoint pointer symbol for another selected waypoint in accordance with an embodiment of the present invention.

FIG. 6 depicts an exemplary embodiment of a selection of another waypoint symbol from another waypoint cluster. The waypoint cluster 326 includes an airport waypoint symbol 328 and a VOR waypoint symbol 330 (see FIG. 3). In this example, the airport waypoint symbol 328 from the waypoint cluster 326 is selected. A waypoint locator symbol 602 and a waypoint pointer symbol 604 clearly depict the selected airport waypoint symbol 328.

In the example of FIG. 6, the waypoint locator symbol 602 includes a background area 606 in the form of a circle, an outline shape 608 in the form of a circle around the perimeter of the background area, and the re-rendered airport waypoint symbol 328. The airport waypoint symbol 328 is generated at the background area 606 of the waypoint locator symbol 602. Further, the waypoint pointer symbol 604 of FIG. 6 includes a line rendered between the present position symbol 316 and the waypoint locator symbol 602. Optionally, a waypoint identifier 610 and other aircraft data 324 may be included in the display 104D.

It will be appreciated that the waypoint locator symbols of FIGS. 4–6 include a background area having a shape and an outline shape within, on a portion of, at the perimeter of, or surrounding the background area. In the embodiments of FIGS. 4–6, the combination of the background area and the outline shape enable a user to clearly identify a selected waypoint by rendering the area surrounding the selected waypoint in a background color. In some embodiments, this may, for example, provide the appearance that the background area is "blank." This enables a user to clearly identify the selected waypoint and its surrounding area. Further, the waypoint pointer symbol of FIGS. 4–6, in the form of a line between the present position and the waypoint locator symbol, enables the user to clearly identify the path from the present position to the selected waypoint.

It will be appreciated that other types of waypoint locator symbols and other types of waypoint pointer symbols may be used. The waypoint locator symbol and the waypoint pointer symbol embodiments of FIGS. 4–6 are exemplary embodiments only.

It will further be appreciated that the architecture of the navigation system 102 of FIG. 1 depicts a logical view of the navigation system. The components depicted in FIG. 1 may be combined and/or split to provide the functionality described with respect to FIG. 1. Further, the graphics engine 112, as a whole, may provide the functionality of the map engine 124 and the map compositor 126. Separate components for the map engine 124 and the map compositor 126 may not be necessary or may be provided separate to, but linked with, the graphics engine 112.

Figure 7:
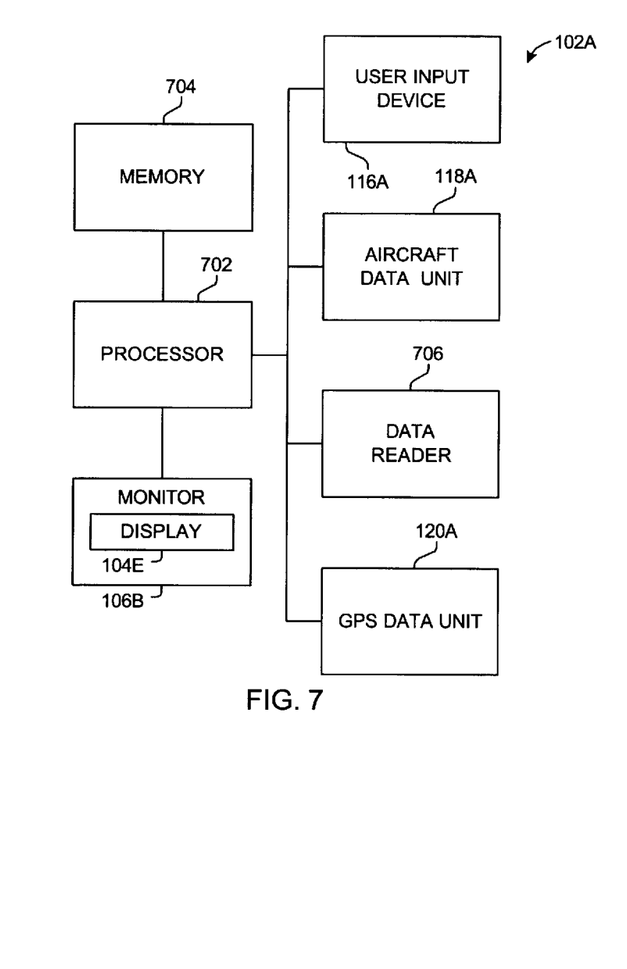
FIG. 7 is a block diagram illustrating another navigation system in accordance with an embodiment of the present invention.

FIG. 7 depicts an exemplary embodiment of another architecture for a navigation system 102A configured to generate a display 104E to a monitor 106B. The navigation system 102A of FIG. 7 includes a processor 702 configured to process the navigation engine and the graphics engine. The processor 702 has associated memory 704. The memory 704 may include one or more of a random access memory (RAM), an EPROM, an EEPROM, and/or another memory device. The memory 704 may be configured to temporarily, semi-permanently, and/or permanently store data, including navigation data, aircraft data, and/or cartography data. The processor 702 further may be configured to communicate with a data reader 706. The data reader 706 may be configured to read and/or store aeronautical data, including cartography data and/or navigation data, to and/or from a data card. The data reader 706 may be, for example, a compact flash card reader configured to access a compact flash card on which aeronautical data may be stored. The other components identified in this Figure are, for example, the same as the components of FIG. 1. Therefore, they retain a corresponding reference numeral.

Figure 8:
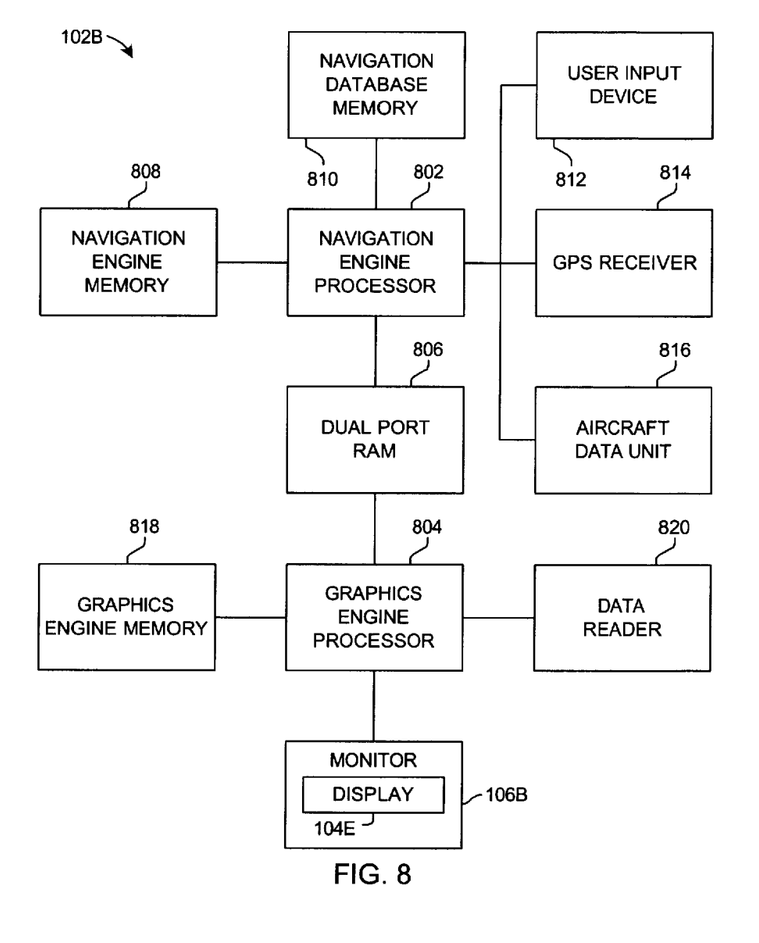
FIG. 8 is a block diagram illustrating another navigation system in accordance with an embodiment of the present invention.

FIG. 8 depicts an exemplary embodiment of another architecture for a navigation system 102B configured to generate a display 104E to a monitor 106B. The navigation system 102B includes a navigation engine processor 802 configured to process a navigation engine and a graphics engine processor 804 configured to process a graphics engine. The navigation engine processor 802 and the graphics engine processor 804 may store information and communicate via a dual port RAM 806.

The navigation engine processor 802 may read graphics engine programming from a navigation engine memory 808. The navigation engine memory 808 may include an EPROM, an EEPROM, and/or another type of memory. The navigation engine processor 802 further may be associated with a navigation database memory 810 configured to store navigation data. The navigation database memory 810 may include an EPROM, an EEPROM, and/or another type of memory.

The navigation engine processor 802 also may communicate with an optional user input device 812, a GPS receiver 814, and/or an aircraft data unit 816. These components may, for example, provide the same functionality as the correspondingly-numbered and/or named components of FIG. 1.

The graphics engine processor 804 may be associated with a graphics engine memory 818 configured to store programming for a graphics engine. The graphics engine memory 818 may include an EPROM, an EEPROM, and/or another type of memory. The graphics engine processor 804 also may communicate with a data reader 820. The data reader 820 may be configured to read and/or store aeronautical data, including cartography data and/or navigation data, from a data card. Preferably, the data reader 820 is configured to read a compact flash data card on which aeronautical data is stored.

Those skilled in the art will appreciate that variations from the specific embodiments disclosed above are contemplated by the invention. The invention should not be restricted to the above embodiments, but should be measured by the following claims.

What is claimed is:

1. A method for identifying a waypoint on a navigation map generated for a flight display comprising:
   receiving an input for selecting the waypoint;
   generating a waypoint locator symbol relative to the selected waypoint; and
   generating a waypoint pointer symbol between the waypoint locator symbol and a position on the navigation map representing a present position.

2. The method of claim 1 wherein the step of generating the waypoint locator symbol relative to the selected waypoint comprises at least one member of a group comprising:
   (a) generating a background area for the selected waypoint and generating an outline shape for the background area, the background area having a background area color and the outline shape having a shape color different from the background area color; and
   (b) generating a background area for the selected waypoint, generating an outline shape for the background area, and generating a waypoint symbol representing the selected waypoint at the background area, the background area having a background area color and the outline shape having a shape color different from the background area color.

3. The method of claim 2 wherein step (a) comprises generating the background area around a waypoint symbol corresponding to the selected waypoint.

4. The method of claim 1 wherein the step of generating the waypoint locator symbol relative to the selected waypoint comprises:
   generating a background area for the selected waypoint, the background area having a background area color; and
   generating a circle for a perimeter of the background area, the circle having a color different from the background area color.

5. The method of claim 1 wherein the step of generating a waypoint pointer symbol between the waypoint locator symbol and the position on the navigation map representing the present position comprises generating a line between the waypoint locator symbol and the position on the navigation map representing the present position.

6. The method of claim 1 further comprising rendering the waypoint locator symbol and the waypoint pointer symbol as an overlay of the navigation map.

7. The method of claim 1 further comprising rendering a composite map of the navigation map, the waypoint locator symbol, and the waypoint pointer symbol.

8. The method of claim 1 further comprising rendering at least one aircraft data symbol for the navigation map.

9. The method of claim 1 further comprising generating a present position symbol representing the present position on the navigation map.

10. The method of claim 1 further comprising:
    receiving a second input for selecting a second waypoint;
    generating a second waypoint locator symbol relative to the selected second waypoint; and
    generating a second waypoint pointer symbol between the second waypoint locator symbol and the position on the navigation map representing the present position.

11. A system for identifying a waypoint for a flight display comprising:
    a navigation engine configured to receive waypoint data, to receive a user input for a selected waypoint, and to transmit the waypoint data and an identification of the selected waypoint; and
    a graphics engine configured to receive cartography data, to receive the waypoint data and the selected waypoint identification from the navigation engine, and to generate a navigation map for display, the navigation map comprising a waypoint locator symbol relative to a position of the selected waypoint and a waypoint pointer symbol between the waypoint locator symbol and a navigation map position representing a present position.

12. The system of claim 11 further comprising:
an aeronautical data unit configured to transmit the cartography data to the graphics engine; and
a navigation database configured to store the waypoint data and to transmit the waypoint data to the navigation engine.

13. The system of claim 11 wherein the graphics engine comprises:
a map engine configured to generate the navigation map; and
a map compositor configured to generate the waypoint locator symbol and the waypoint pointer symbol.

14. The system of claim 11 wherein the graphics engine is configured to generate the waypoint locator symbol and the waypoint pointer symbol for display as an overlay of other symbols for the navigation map.

15. The system of claim 11 wherein the graphics engine is configured to generate the waypoint locator symbol, a selected waypoint symbol corresponding to the selected waypoint, and the waypoint pointer symbol as an overlay of other symbols for the navigation map.

16. The system of claim 11 wherein the graphics engine is configured to combine the navigation map, the waypoint locator symbol, a selected waypoint symbol corresponding to the selected waypoint, the waypoint pointer symbol, and other symbols to create a composite map and to generate the composite map for display for the navigation map.

17. The system of claim 11 wherein the waypoint locator symbol comprises at least one member of a group comprising:
(a) a background area relative to the position of the selected waypoint and an outline shape for the background area, the background area having a background area color and the outline shape having a shape color different from the background area color; and
(b) a background area relative to the position of the selected waypoint, an outline shape for the background area, and a waypoint symbol representing the selected waypoint at the background area, the background area having a background area color and the outline shape having a shape color different from the background area color.

18. The system of claim 17 wherein the background area for the waypoint locator symbol of (a) is generated around a selected waypoint symbol corresponding to the selected waypoint.

19. The system of claim 11 wherein the waypoint locator symbol comprises a background area for the selected waypoint and a circle around a perimeter of the background area, the background area having a background area color and the circle having a color different from the background area color.

20. The system of claim 11 wherein the waypoint pointer symbol comprises a line between the waypoint locator symbol and the position on the navigation map representing the present position.

21. The system of claim 11 wherein:
the navigation engine further is configured to receive a second user input for a selected second waypoint, and to transmit second waypoint data for the second user input; and
the graphics engine further is configured to receive the second waypoint data from the navigation engine and to generate for display a second waypoint locator symbol relative to a location of the selected second waypoint, a second waypoint symbol identifying the selected second waypoint, and a second waypoint pointer symbol between the second waypoint locator symbol and the position on the navigation map representing the present position.

22. The system of claim 11 further comprising:
an aircraft data unit configured to collect aircraft data and to transmit the aircraft data to the navigation engine; and
a GPS unit configured to receive GPS data and to transmit the GPS data to the navigation engine;
wherein the navigation engine is configured to process the aircraft data and the GPS data and to transmit the aircraft data and the GPS data to the graphics engine; and
wherein the graphics engine is configured to generate the aircraft data and the GPS data for display in connection with the navigation map.

23. The system of claim 11 further comprising a user input device configured to transmit the user input to the navigation engine.

24. The system of claim 11 further comprising an aircraft configured to house the navigation engine and the graphics engine.

25. A method for identifying a waypoint on a navigation map generated for a flight display comprising:
receiving an input for selecting the waypoint;
generating a waypoint locator symbol relative a position of the selected waypoint, the waypoint locator symbol comprising a background area and an outline shape;
generating a waypoint symbol corresponding to the selected waypoint at the waypoint locator symbol; and
generating a waypoint pointer symbol between the waypoint locator symbol and a navigation map position representing a present position.

* * * * *